United States Patent
Kakutani

(10) Patent No.: US 9,705,876 B2
(45) Date of Patent: Jul. 11, 2017

(54) IMAGE FORMING APPARATUS CAPABLE OF REDUCING SECURITY RISK, METHOD OF CONTROLLING IMAGE FORMING APPARATUS, SYSTEM INCLUDING IMAGE FORMING APPARATUS, AND STORAGE MEDIUM

(71) Applicant: CANON KABUSHIKI KAISHA, Tokyo (JP)

(72) Inventor: Naoya Kakutani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/529,888

(22) Filed: Oct. 31, 2014

(65) Prior Publication Data
US 2015/0128239 A1    May 7, 2015

(30) Foreign Application Priority Data
Nov. 5, 2013  (JP) ................................. 2013-229245

(51) Int. Cl.
*G06F 7/04* (2006.01)
*H04L 29/06* (2006.01)

(52) U.S. Cl.
CPC .................................. *H04L 63/083* (2013.01)

(58) Field of Classification Search
CPC .................................................. H04L 63/083
USPC ............................................................ 726/7
See application file for complete search history.

(56) References Cited

U.S. PATENT DOCUMENTS

| 2006/0233580 | A1* | 10/2006 | Ueda | H04N 1/4413 400/62 |
| 2007/0136483 | A1* | 6/2007 | Lee | G06F 21/31 709/229 |
| 2008/0052761 | A1* | 2/2008 | Minami | G06F 21/608 726/2 |
| 2008/0201775 | A1* | 8/2008 | Kai | G06F 21/629 726/19 |
| 2009/0293119 | A1* | 11/2009 | Jonsson | G06F 21/36 726/19 |

(Continued)

FOREIGN PATENT DOCUMENTS

| CN | 1980304 A | 6/2007 |
| CN | 1848073 B | 5/2010 |
| JP | 2009230178 A | 10/2009 |

OTHER PUBLICATIONS

Office Action issued in Chinese Patent Application No. 201410635773.7 mailed May 2, 2017. English translation provided.

*Primary Examiner* — Mohammad W Reza
(74) *Attorney, Agent, or Firm* — Rossi, Kimms & McDowell LLP

(57) ABSTRACT

An image forming apparatus capable of notifying a user of violation of the information security policy or preventing execution of the job from being stopped. A password policy set via a password policy-setting screen. A password-added print job transmitted from a PC is stored in a storage device. A user inputs a password so as to execute processing of the password-added print job stored in the storage device. If the password input by the user matches the password added to the job, processing of the password-added print job is executed. It is determined whether or not the password added to the print job satisfies the password policy.

14 Claims, 17 Drawing Sheets

(56) References Cited

U.S. PATENT DOCUMENTS

2012/0105900 A1\* 5/2012 Tsuzuki ............ G06K 15/4095
                                                     358/1.14

\* cited by examiner

IMAGE FORMING APPARATUS CAPABLE OF REDUCING SECURITY RISK, METHOD OF CONTROLLING IMAGE FORMING APPARATUS, SYSTEM INCLUDING IMAGE FORMING APPARATUS, AND STORAGE MEDIUM

BACKGROUND OF THE INVENTION

Field of the Invention

The present invention relates to an image forming apparatus that is capable of reducing security risk, a method of controlling the image forming apparatus, a system including the image forming apparatus, and a storage medium, and more particularly to an image forming apparatus that has an information security policy applied to jobs processed thereby, a method of controlling the image forming apparatus, a system including the image forming apparatus, and a storage medium.

Description of the Related Art

The information security policy is a basic policy on information security, i.e. a basic policy concerning security-based restrictions for preventing unauthorized use of information, invasion from the outside, information leakage, and unauthorized use of devices and apparatuses connected to the network. For example, among items of the information security policy, a password policy is known which reinforces security by increasing the length of a password to be set such that complexity of the password is increased.

It is desirable that personal computers (hereinafter referred to as the "PCs"), and server apparatuses, such as a file server and an authentication server, which are connected to a network of e.g. an office are operated according to an information security policy determined on an office-by-office basis.

For example, as an example of the above-mentioned PC, there has been known a PC that stops, if a violation of the information security policy is detected at the startup of the PC, a function of the PC to thereby suppress an operation which violates the information security policy (see e.g. Japanese Patent Laid-Open Publication No. 2009-230178).

In recent years, apparatuses in an office other than PCs and server apparatus, connected to a network, include peripheral apparatuses, such as a multifunction peripheral. Particularly, the multifunction peripheral has been made even more sophisticated and complicated such that it is equipped with not only an image print function and an image transmission function, but also a function of storing image data and a file server function for providing image data to PCs. Such a multifunction peripheral plays the same role as a server apparatus on the network, and is required to follow the information security policy at the startup of the multifunction peripheral, similarly to the PCs and the server apparatus.

However, in spite of the fact that apparatuses, such as PCs, server apparatuses, and multifunction peripherals, are required to strictly follow the information security policy at the startup of the apparatus, it is not required to perform an operation for checking execution of a job after the startup of the apparatus as to whether or not it violates the information security policy. Therefore, for example, even when a user of the multifunction peripheral executes a job, the user's consciousness of security remains low and is not improved, causing a security risk that an important document, such as a confidential document, is easily printed by a person other than the user.

Further, although it is possible to strictly follow the information security policy with respect to execution of a job by stopping execution of the job itself, this is troublesome to the user who uses the multifunction peripheral.

SUMMARY OF THE INVENTION

The present invention provides an image forming apparatus that, even in a case where a user instructs a multifunction peripheral to execute a job which violates an information security policy set for the multifunction peripheral, is capable of notifying the user of violation of the information security policy or preventing execution of the job from being stopped, thereby reducing the security risk, an image forming method, a system including the image forming apparatus, and a storage medium.

In a first aspect of the present invention, there is provided an image forming apparatus comprising a setting unit configured to set a condition of a usable password, a storage unit configured to store password-added data transmitted from an information processing apparatus, an input unit configured to enable an operator to input the password so as to execute processing of the password-added data stored in the storage unit, an execution unit configured to execute the processing of the password-added data in a case where the password input by the operator corresponds to the password added to the data, and a determination unit configured to determine whether or not the password added to the data satisfies the condition of the password.

In a second aspect of the present invention, there is provided a system comprising an information processing apparatus, and an image forming apparatus, wherein the information processing apparatus comprises a first input unit configured to enable an operator to input a password, and a transmission unit configured to transmit password-added data to the image forming apparatus, a password added to the data being input by the operator, wherein the image forming apparatus comprises a setting unit configured to set a condition of a usable password, a storage unit configured to store password-added data transmitted from an information processing apparatus, a second input unit configured to enable an operator to input the password so as to execute processing of the password-added data stored in the storage unit, and an execution unit configured to execute processing of the password-added data in a case where the password input from the operator by the second input unit corresponds to the password added to the data, and wherein the information processing apparatus comprises an acquisition unit configured to acquire information indicative of the condition of the password from the image forming apparatus, and a determination unit configured to determine based on the acquired information whether or not the password input from the operator by the first input unit satisfies the condition of the password.

In a third aspect of the present invention, there is provided a method of controlling an image forming apparatus, comprising setting a condition of a usable password, storing password-added data transmitted from an information processing apparatus, enabling an operator to input the password so as to execute processing of the password-added data stored by said storing, executing the processing of the password-added data in a case where the password input by the operator corresponds to the password added to the data, and determining whether or not the password added to the data satisfies the condition of the password.

In a fourth aspect of the present invention, there is provided a computer-readable storage medium storing a computer-readable program for causing a computer to execute a method of controlling an information processing apparatus included in a system including the image processing apparatus, and an image forming apparatus including a setting unit configured to set a condition of a usable password, a storage unit configured to store password-added data transmitted from an information processing apparatus, an input unit configured to enable an operator to input the password so as to execute processing of the password-added data stored in the storage unit, and an execution unit configured to execute the processing of the password-added data in a case where the password input by the operator corresponds to the password added to the data, wherein the method comprises inputting a password according to an operation by the operator, transmitting the password-added data to the image forming apparatus, a password added to the data being input by the operator, acquiring information indicative of the condition of the password from the image forming apparatus, and determining based on the acquired information whether or not the password input from the operator satisfies the condition of the password.

According to the present invention, even in a case where a user instructs the multifunction peripheral to execute a job which violates the information security policy set for the multifunction peripheral, it is possible to notify the user of violation of the information security policy or prevent execution of the job from being stopped, to thereby reduce the security risk.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
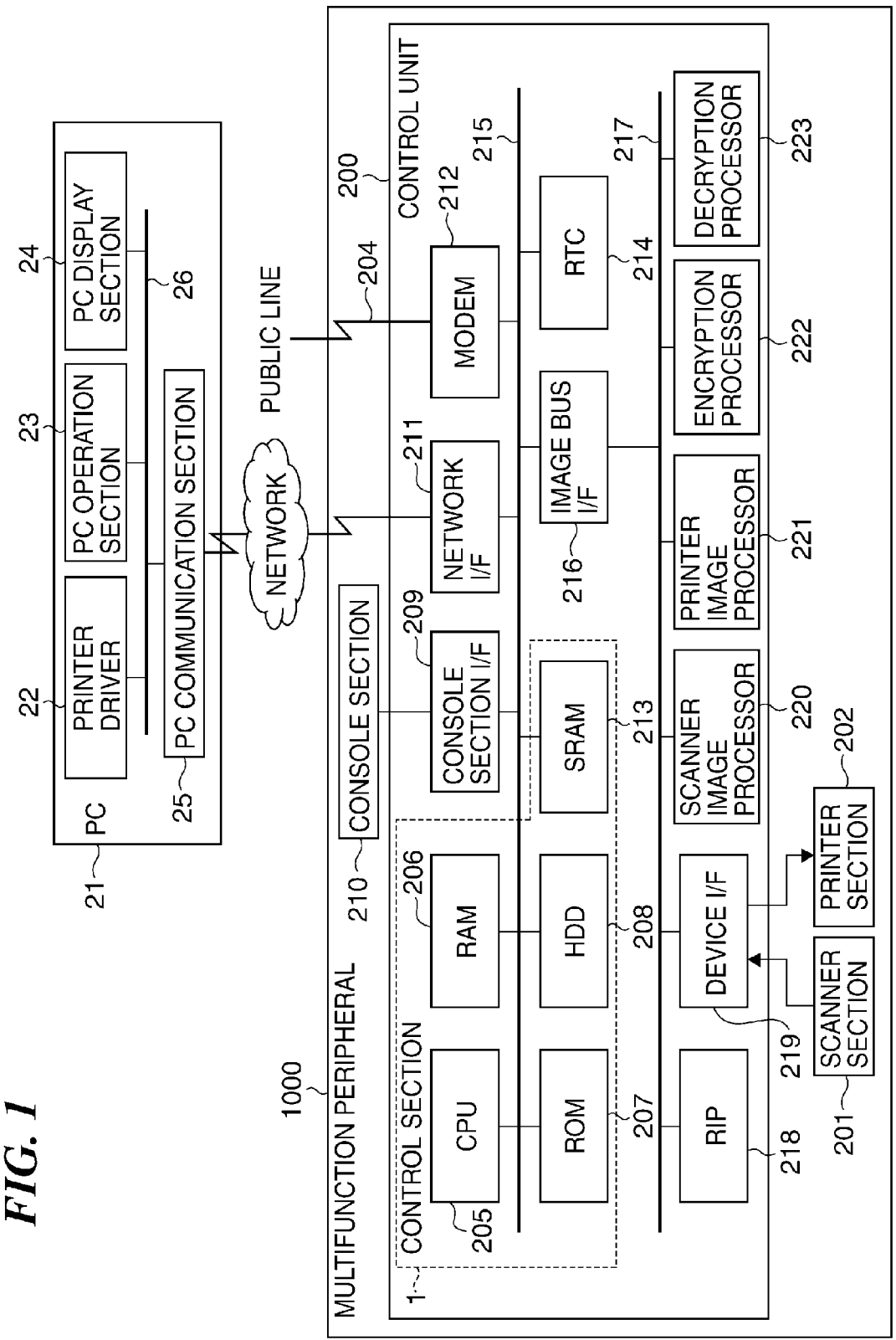
FIG. 1 is a schematic block diagram of an image forming system including a multifunction peripheral as an image forming apparatus according to an embodiment of the present invention.

FIG. 1 is a schematic block diagram of an image forming system including a multifunction peripheral 1000 as an image forming apparatus according to an embodiment of the present invention.

The image forming system shown in FIG. 1 is comprised of the multifunction peripheral 1000 and a PC 21 as an information processing apparatus, which are connected to each other via a network.

The multifunction peripheral 1000 is comprised of a control unit 200, a scanner section 201, a printer section 202, and a console section 210.

The control unit 200 includes a control section 1 comprised of a CPU 205, a RAM 206, a ROM 207, an HDD 208, and an SRAM 213, a console section interface 209, a network interface 211, a modem 212, and a RTC (Real Time Clock) 214, which are connected to each other via a system bus 215. The control unit 200 further includes an RIP (Raster Image Processor) 218, a device interface 219, a scanner image processor 220, a printer image processor 221, an encryption processor 222, and a decryption processor 223, which are connected to each other via an image bus 217. The system bus 215 and the image bus 217 are connected to each other via an image bus interface 216 as a bus bridge.

The console section interface 209, the network interface 211, and the modem 212 are connected to the console section 210, the network, and a public line 204, respectively. Further, the device interface 219 is connected to the scanner section 201 and the printer section 202.

The CPU 205 controls the overall operation of the image forming apparatus, and executes processes according to programs stored in the RAM 206. The RAM 206 is a system work memory used for the operation of the CPU 205, and is also used as an image memory for temporarily storing image data, user information, a password, and so on. The ROM 207 is a boot ROM storing a boot program for the system.

The hard disk drive (HDD) 208 stores system software, applications, and image data, etc. The SRAM 213 is a nonvolatile storage medium capable of performing high-speed operation. The RTC 214 is a real time clock that counts current time continuously even in a state in which the control unit 200 is not powered on.

The image bus 217 is implemented by a PCI bus or an IEEE 1394 bus, and is capable of performing high-speed transfer of image data. The RIP 218 generates a bitmap image based on a PDL code. The device interface 219 performs synchronous-to-asynchronous or asynchronous-to-synchronous conversion of image data.

The scanner image processor 220 performs correction, manipulation, and editing on image data input from the scanner section 201. The printer image processor 221 performs correction, resolution conversion, and other processing on image data to be output to the printer section 202. The encryption processor 222 encrypts input data including image data. The decryption processor 223 decrypts encrypted data.

The scanner section 201 includes a platen glass and an automatic document feeder (ADF), and optically reads an original placed on the platen glass or the ADF when an original reading start button (not shown) of the console section 210 is pressed. The printer section 202 outputs image data or performs like processing. Further, using the console section 210, a user makes settings on page layout on a sheet, settings on processing performed by a finisher, such as stapling, and settings on output from the printer section 202, such as image quality setting, including density setting.

It is preferable that the multifunction peripheral 1000 is a digital MFP (Multi-Function Peripheral), but any other printer may be employed insofar as it has a password-added reservation printing function.

The PC 21 includes a printer driver 22, a PC operation section 23, a PC display section 24, and a PC communication section 25, which are connected to each other via an internal bus 26. The PC communication section 25 is connected to the network.

The printer driver 22 is a device driver that controls the multifunction peripheral 1000, and the PC operation section 23 is comprised of a keyboard, a pointing device, etc. The PC display section 24 is a display device, and for example, displays a printer driver-setting screen 301 described hereinafter with reference to FIG. 2, and a password-added print job-setting screen 321 described hereinafter with reference to FIG. 3. The PC communication section 25 transmits a print job and the like, to the multifunction peripheral 1000 via the network.

Figure 2:
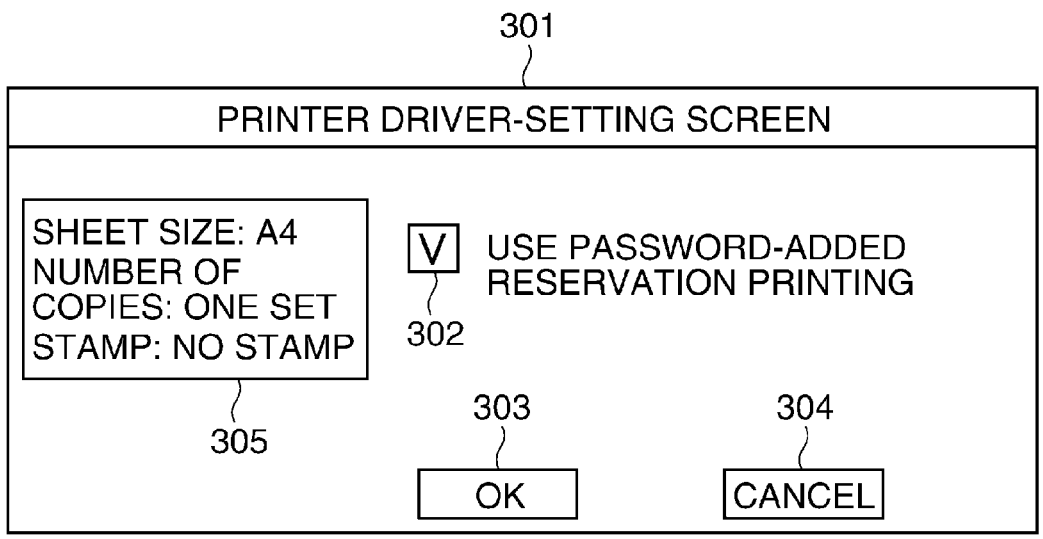
FIG. 2 is a diagram useful in explaining a printer driver-setting screen displayed by a PC display section appearing in FIG. 1.

FIG. 2 is a diagram useful in explaining the printer driver-setting screen 301 displayed on the PC display section 24 appearing in FIG. 1.

Referring to FIG. 2, the printer driver-setting screen 301 has a check box 302 for setting whether or not to use a password-added reservation printing function, described hereinafter, an OK button 303, a cancel button 304, and a display 305 concerning print settings.

The password-added reservation printing function is a function that reserves a password-added print job which has been transmitted to the multifunction peripheral 1000 from an external apparatus, such as the PC 21, in the multifunction peripheral 1000 or a print server, and allows a user to print the reserved print job by operating the console section 210 of the multifunction peripheral 1000.

When the OK button 303 is pressed after the check box 302 is checked, the password-added reservation printing function is set. The OK button 303 is pressed to finalize the settings of the printer driver 22. The cancel button 304 is pressed to cancel a change of the settings of the printer driver 22. The display 305 concerning print settings displays the settings concerning a sheet size, the number of copies, a stamp, etc.

Figure 3:
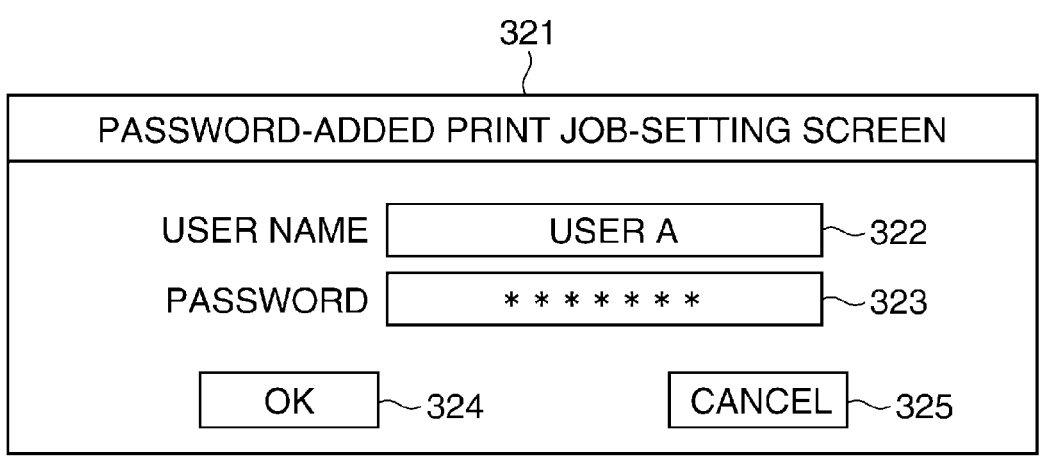
FIG. 3 is a diagram useful in explaining a password-added print job-setting screen displayed by the PC display section.

FIG. 3 is a diagram useful in explaining the password-added print job-setting screen 321 displayed on the PC display section 24, appearing in FIG. 1.

Referring to FIG. 3, the password-added print job-setting screen 321 has a user name input field 322, a password input field 323, an OK button 324, and a cancel button 325.

A user name to be set for the password-added print job is input in the user name input field 322, a password to be set for the password-added print job is input in the password input field 323. The user name and password to be input in the user name input field 322 and the password input field 323, respectively, may be a default value associated with user information of the PC 21 and a default value associated with the password of the printer driver 22, respectively.

The OK button 324 is pressed to cause the settings to be reflected on the printer driver 22 after completion of inputting the user name and password to be set for the password-added print job. The cancel button 325 is pressed to cancel a change of the settings of the user name and password for the password-added print job.

Figure 4:
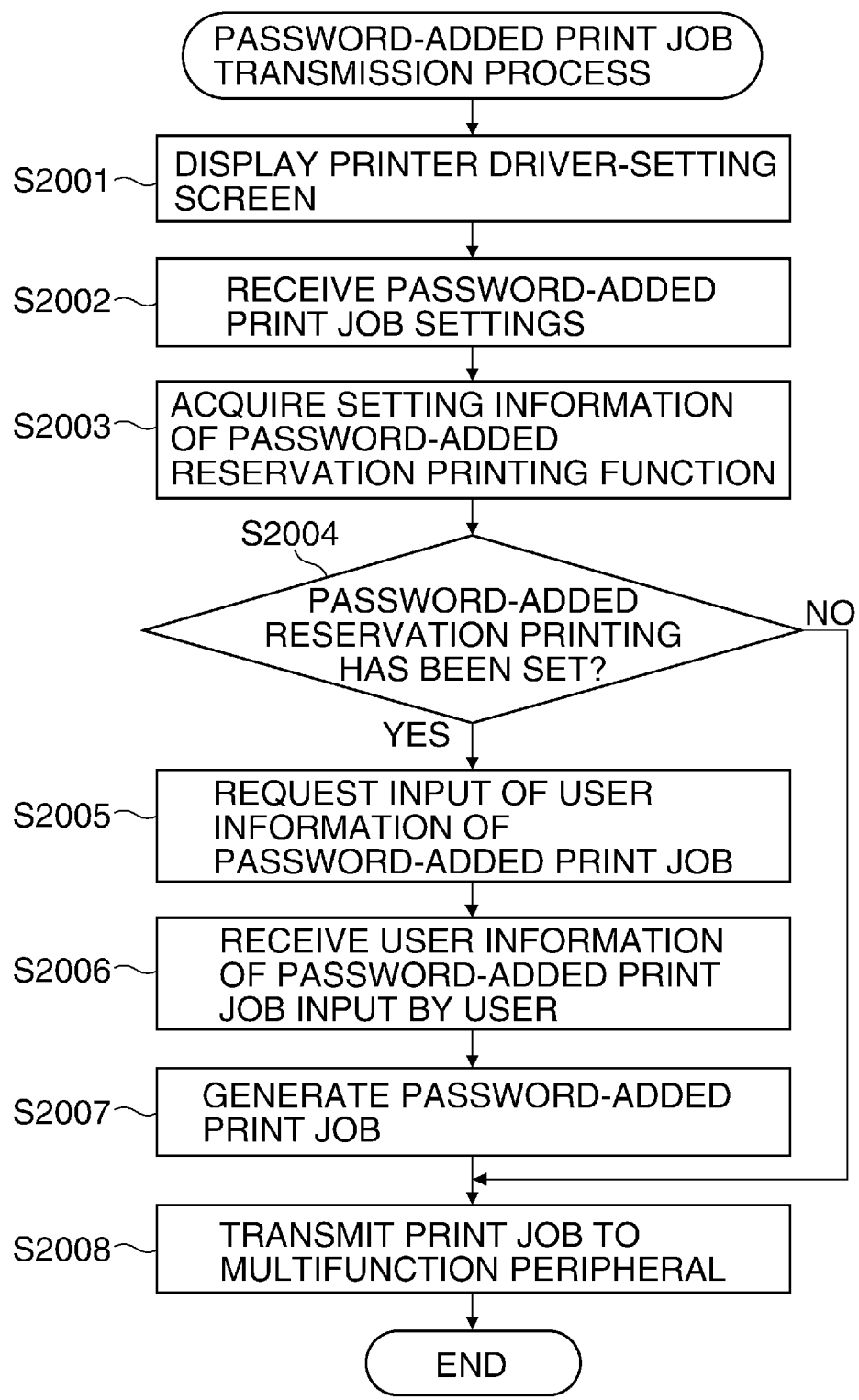
FIG. 4 is a flowchart of a password-added print job transmission process performed by a printer driver appearing in FIG. 1.

FIG. 4 is a flowchart of a password-added print job transmission process performed by the printer driver 22 appearing in FIG. 1.

The process in FIG. 4 is executed by the printer driver 22, for transmitting a password-added print job from the PC 21 appearing in FIG. 1, to the multifunction peripheral 1000.

Referring to FIG. 4, the printer driver 22 displays the printer driver-setting screen 301 on the PC display section 24 (step S2001), receives password-added print job settings input by a user (step S2002), and acquires setting information of the password-added reservation printing function out of information on the received password-added print job settings, i.e., setting information about whether or not the check box 302 is checked (step S2003).

In a step S2004 following the step S2003, the printer driver 22 determines whether or not the setting of the password-added reservation printing function has been made for a password-added print job to be generated, and if the setting of the password-added reservation printing function has been made, the printer driver 22 requests the user to input a user name and a password for the password-added print job to be generated (hereinafter referred to as the "user information of the password-added print job") from the password-added print job-setting screen 321 (step S2005).

Then, the printer driver 22 receives the user information of the password-added print job to be generated, input by the user (step S2006), generates the password-added print job to which the user information of the password-added print job is added (step S2007), and transmits the generated password-added print job to the multifunction peripheral 1000 via the PC communication section 25 (step S2008), followed by terminating the present process.

If it is determined in the step S2004 that the setting of the password-added reservation printing function has not been made for a password-added print job to be generated, the printer driver 22 skips the steps S2005 to S2007 to directly execute the step S2008, followed by terminating the present process.

Figure 5:
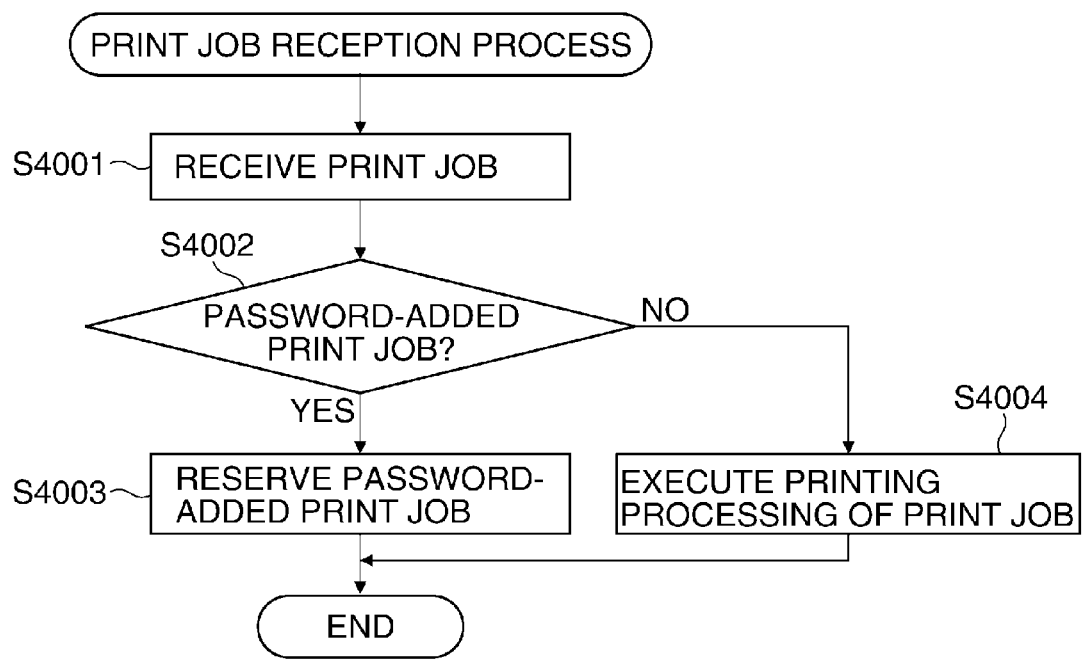
FIG. 5 is a flowchart of a print job reception process for receiving a print job transmitted by the password-added print job transmission process in FIG. 4.

FIG. 5 is a flowchart of a print job reception process for receiving the print job transmitted in the step S2008 in FIG. 4.

The print job reception process in FIG. 5 is executed by the control section 1 of the control unit 200 of the multifunction peripheral 1000, for receiving the print job transmitted in the step S2008 in FIG. 4.

Referring to FIG. 5, first, the control section 1 receives the print job transmitted from the PC communication section 25 of the PC 21 (step S4001), and determines whether or not the received print job is a password-added print job (step S4002).

If it is determined in the step S4002 that the received print job is a password-added print job, print processing of the received password-added print job is not executed, but the received print job is reserved in one of the RAM 206, the ROM 207, the HDD 208, and the SRAM 213, which are included in the control section 1 (step S4003), followed by terminating the present process.

If it is determined in the step S4002 that the received print job is not a password-added print job, print processing of the print job is executed (step S4004), followed by terminating the present process.

Figure 6A:
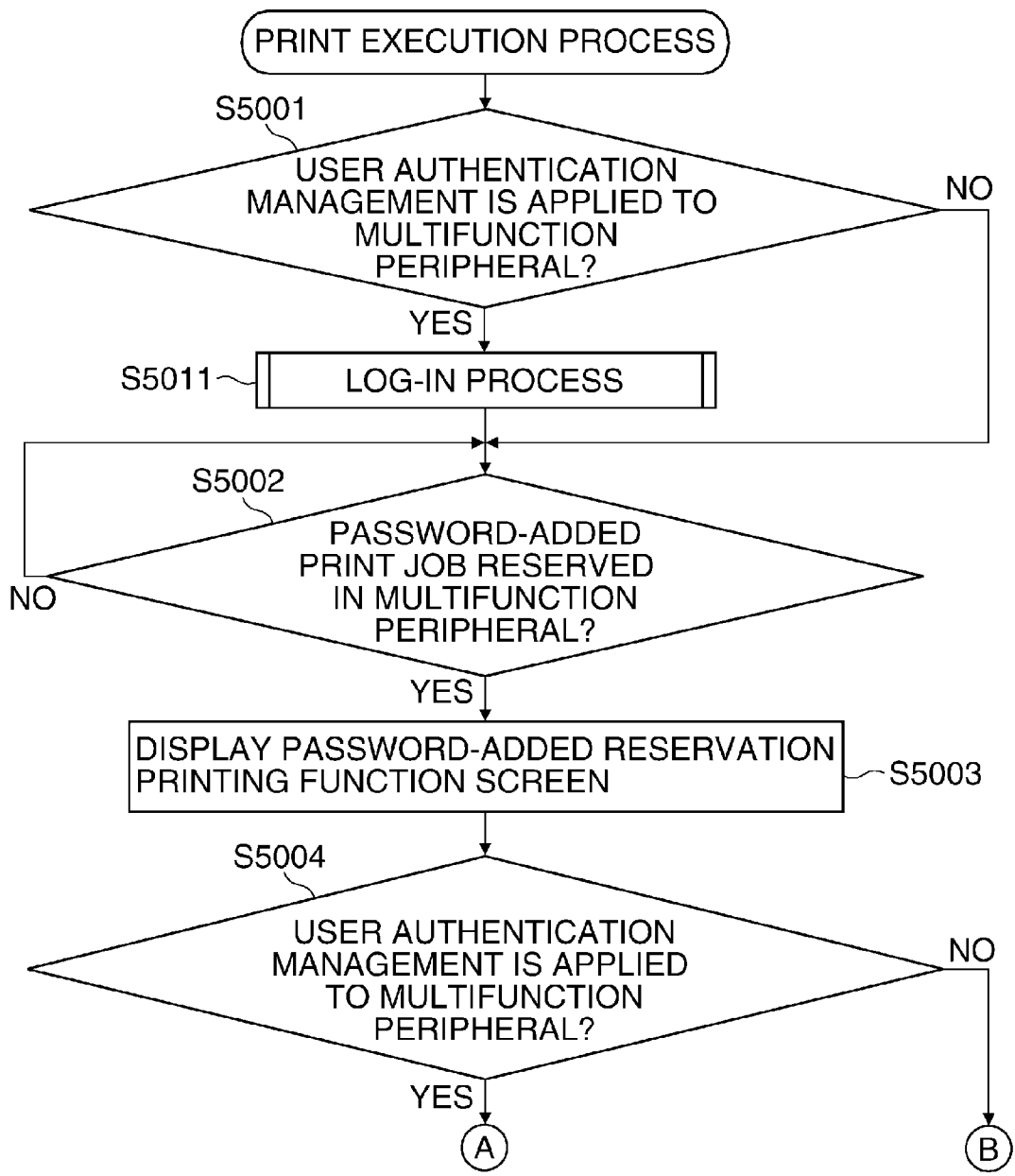
FIG. 6A is a flowchart of a print execution process of a password-added print job, reserved by the print job reception process in FIG. 5.
Figure 6B:
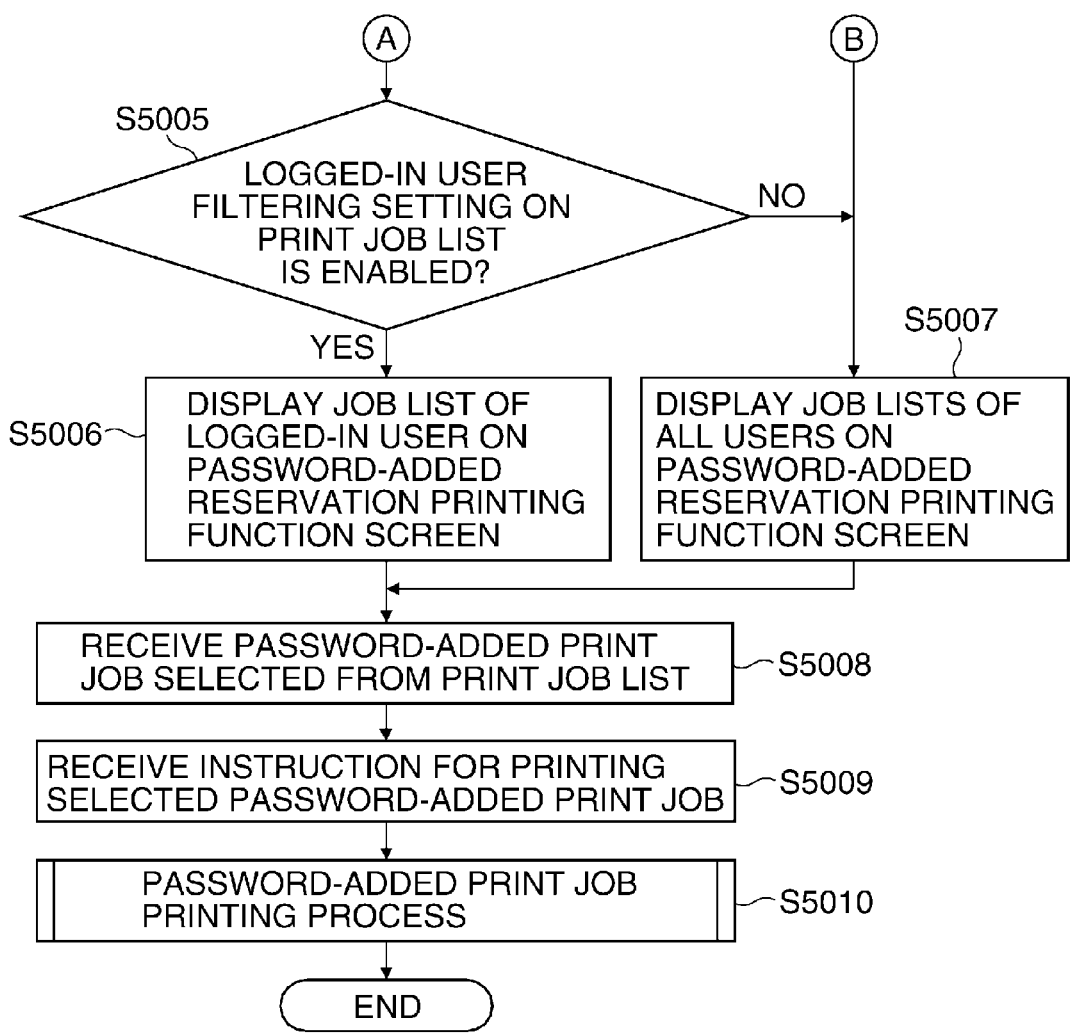
FIG. 6B is a continuation of FIG. 6A.

FIGS. 6A and 6B are a flowchart of a print execution process for executing print processing of the password-added print job which has been reserved in the step S4003 in FIG. 5.

The print execution process in FIGS. 6A and 6B is executed by the control section 1.

Referring to FIG. 6A, first, the control section 1 determines whether or not user authentication management is applied to the multifunction peripheral 1000 (step S5001). If user authentication management is applied, the control section 1 executes a log-in process in FIGS. 8A and 8B, described hereinafter, to store user information of the user permitted to log into the multifunction peripheral 1000 in the RAM 206 (step S5011), and proceeds to a step S5002. If it is determined in the step S5001 that user authentication management is not applied, the control section 1 directly proceeds to the step S5002.

Figure 7:
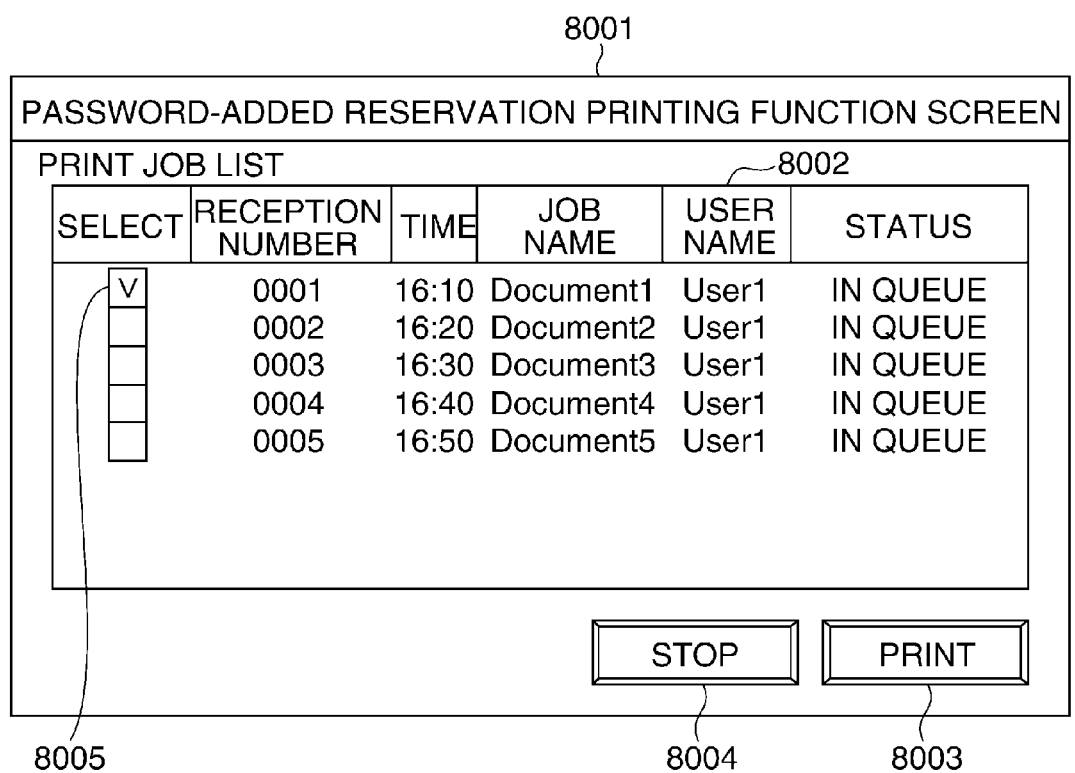
FIG. 7 is a diagram useful in explaining a password-added reservation printing function screen displayed in the print execution process in FIGS. 6A and 6B.

In the step S5002, the control section 1 determines whether or not any password-added print job has been reserved in the multifunction peripheral 1000, and if any password-added print job is reserved, the control section 1 displays a password-added reservation printing function screen 8001, shown in FIG. 7, on the console section 210 (step S5003).

Referring to FIG. 7, the password-added reservation printing function screen 8001 has a print job list 8002, a print button 8003, and a stop button 8004. The print job list 8002 displays a reception number, a print job reception time, a print job name, a user name of a user who has instructed execution of a print job, and a status of the print job, in association with each of print job selection check boxes 80005 for selecting a print job. The print job button 8003 is pressed to execute printing, and the stop button 8004 is pressed to stop printing. Each print job selection check box 8005 is used by a user for selecting a print job which the user desires to print.

Referring back to FIG. 6A, after execution of the step S5003, the control section 1 determines whether or not the user authentication management is applied to the multifunction peripheral 1000 (step S5004), and determines whether or not a logged-in user filtering setting which is a display setting of the print job list 8002 is enabled (step S5005 in FIG. 6B).

If it is determined in the steps S5004 and S5005 that the user authentication management is applied to the multifunction peripheral 1000 (YES to the step S5004) and the logged-in user filtering setting is enabled (YES to the step S5005), the control section 1 displays the job list of the logged-in user on the password-added reservation printing function screen 8001 (step S5006), and proceeds to a step S5008, whereas if the user authentication management is not applied to the multifunction peripheral 1000 (NO to the step S5004), or the logged-in user filtering setting on the print job list 8002 is disabled (NO to the step S5005), the control section 1 displays the job lists of all users on the password-added reservation printing function screen 8001 (step S5007), and proceeds to the step S5008.

In the step S5008, the control section 1 receives a password-added print job selected by the user via the console section 210 out of the print jobs shown on the print job list 8002. Next, the control section 1 receives a print instruction of the selected password-added print job (step S5009). Thereafter, the control section 1 executes a password-added print job printing process described hereinafter with reference to FIGS. 9A and 9B (step S5010), followed by terminating the present process.

Figure 8A:
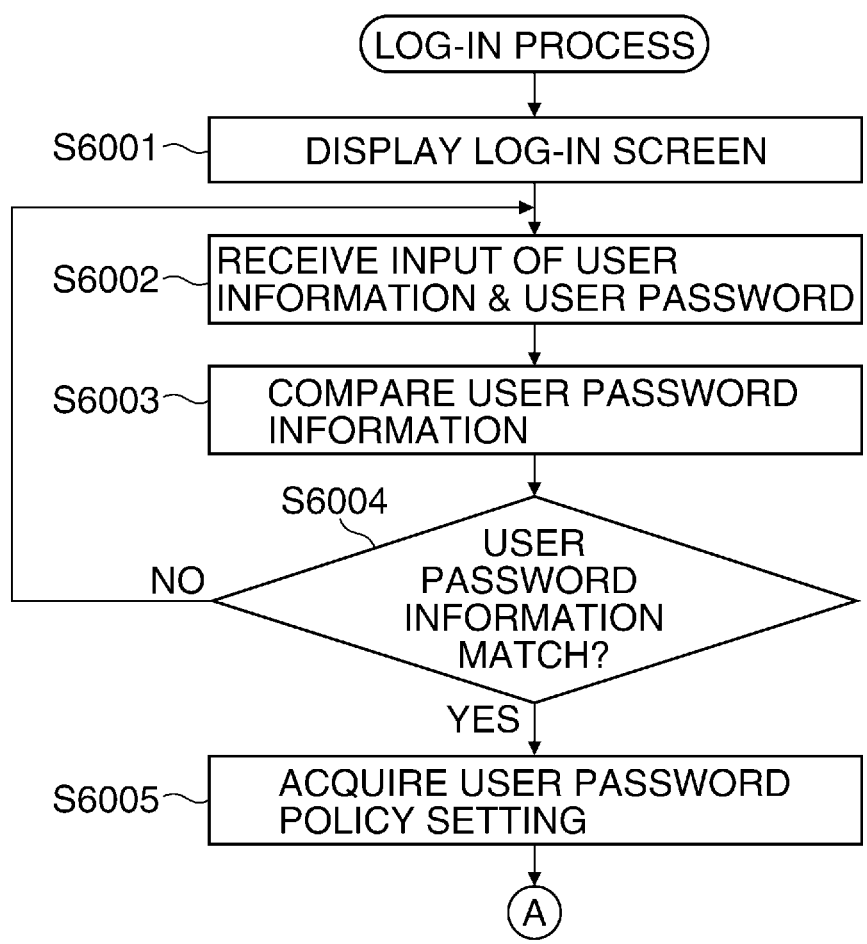
FIG. 8A is a flowchart of a log-in process executed in the print execution process in FIGS. 6A and 6B.
Figure 8B:
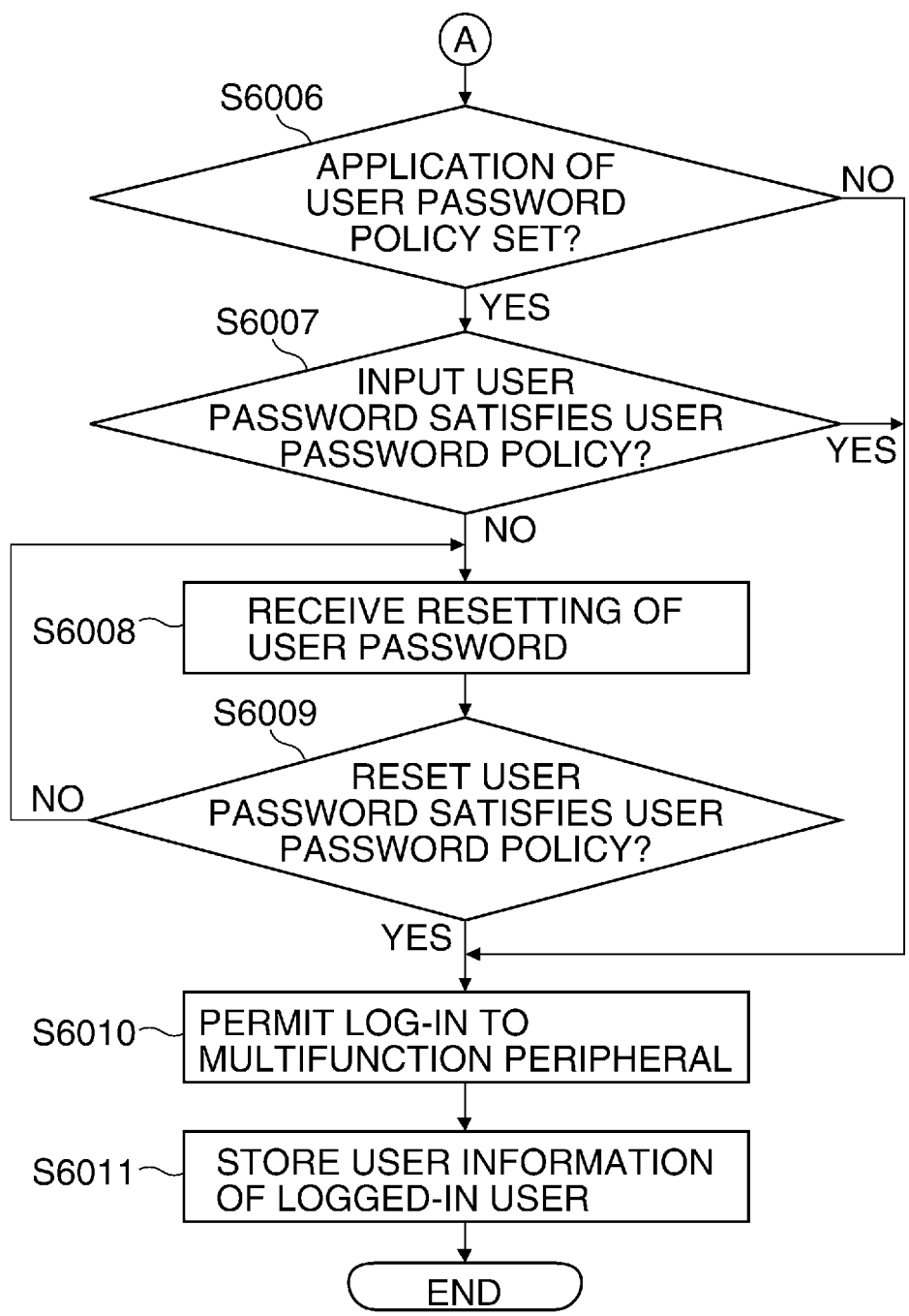
FIG. 8B is a continuation of FIG. 8A.

FIGS. 8A and 8B are a flowchart of the log-in process executed in the step S5011 in FIG. 6A.

Referring to FIG. 8A, first, the control section 1 displays a log-in screen on the console section 210 (step S6001), and the console section 210 receives user information and a user password (hereinafter referred to as the "user password information") input by the user (step S6002). The user password information input by the user is stored e.g. in the RAM 206.

Then, the control section 1 compares the input user password information and the user password information stored in the HDD 208 in advance (step S6003). The control section 1 determines whether or not the input user password information matches the stored user password information (step S6004), and if the input user password information matches the stored user password information, the control section 1 acquires a user password policy setting in which whether or not to apply the user password policy to the input user password information is set, from the SRAM 213 (step S6005).

On the other hand, if the input user password information does not match the stored user password information, for example, if the user password information stored in the HDD 208 in advance has been changed to improve security, the steps S6002 et seq. are repeated until the user password information input by the user matches the user password information stored in the HDD 208 in advance.

Next, the control section 1 determines whether or not the acquired user password policy setting sets application of the user password policy to the input user password information (step S6006 in FIG. 8B), and determines whether or not the input user password satisfies the user password policy (step S6007).

The password satisfying the user password policy is only required to be a complex password, and particularly, the password is preferable to be formed by ten or more characters, and include at least one uppercase alphabetic character and at least one lowercase alphabetic character.

If it is determined in the steps S6006 and S6007 that the acquired user password policy setting sets application of the user password policy to the input user password information, and the input user password does not satisfy the user password policy, the control section 1 proceeds to a step S6008, whereas if the acquired user password policy setting does not set application of the user password policy to the input user password information, or the input user password satisfies the user password policy, the control section 1 proceeds to a step S6010.

In the step S6008, the control section 1 has the user password reset, and then determines whether or not the reset user password satisfies the user password policy (step S6009).

If it is determined in the step S6009 that the reset user password satisfies the user password policy, the control section 1 proceeds to the step S6010, whereas if not, the control section 1 repeats the steps S6008 et seq. until it is determined that the reset user password satisfies the user password policy.

In the step S6010, the control section 1 permits the user to log into the multifunction peripheral 1000, and stores the user information of the logged-in user in the RAM 206 (step S6011), followed by terminating the present process.

Figure 9A:
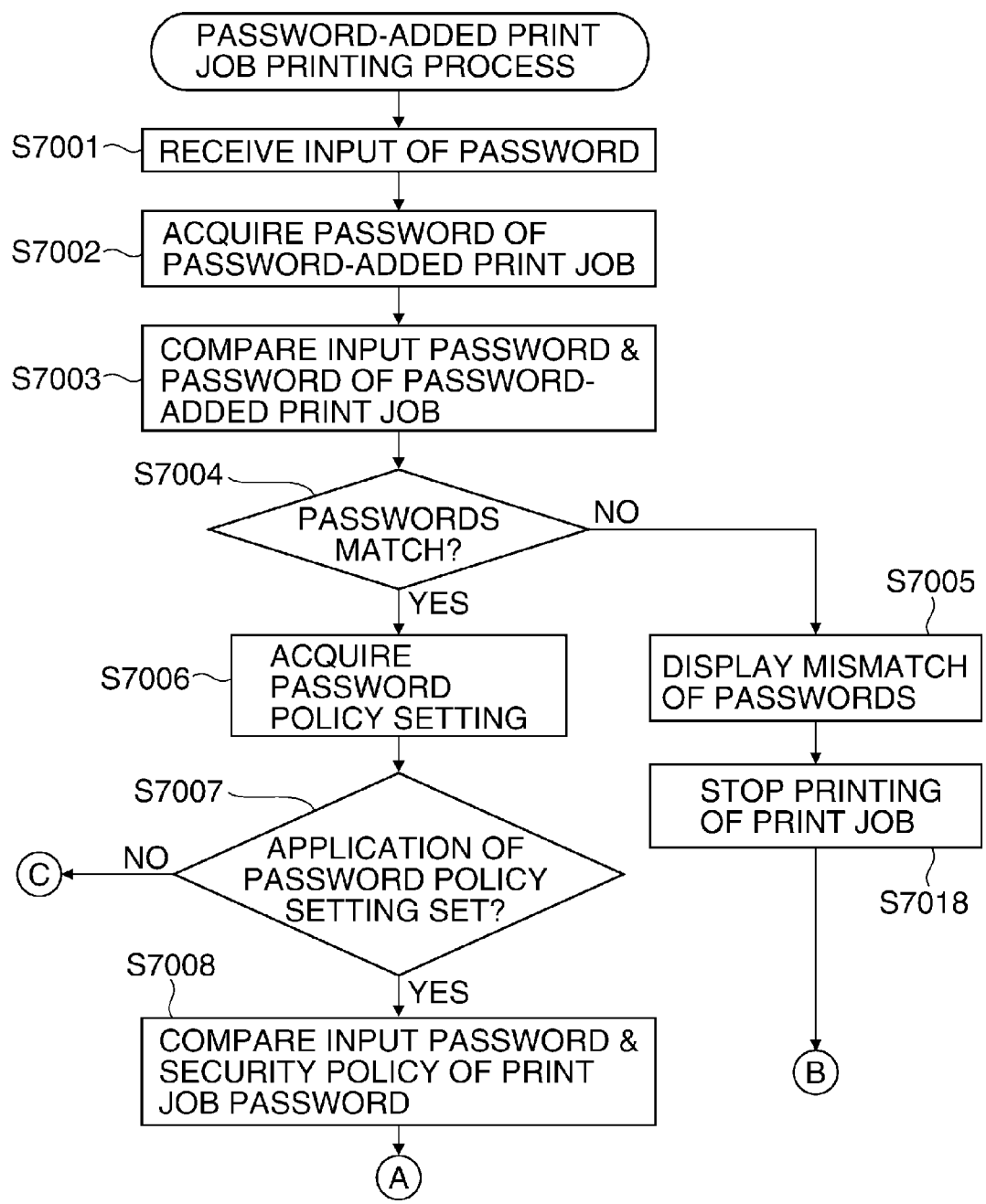
FIG. 9A is a flowchart of a password-added print job printing process executed in the print execution process in FIGS. 6A and 6B.
Figure 9B:
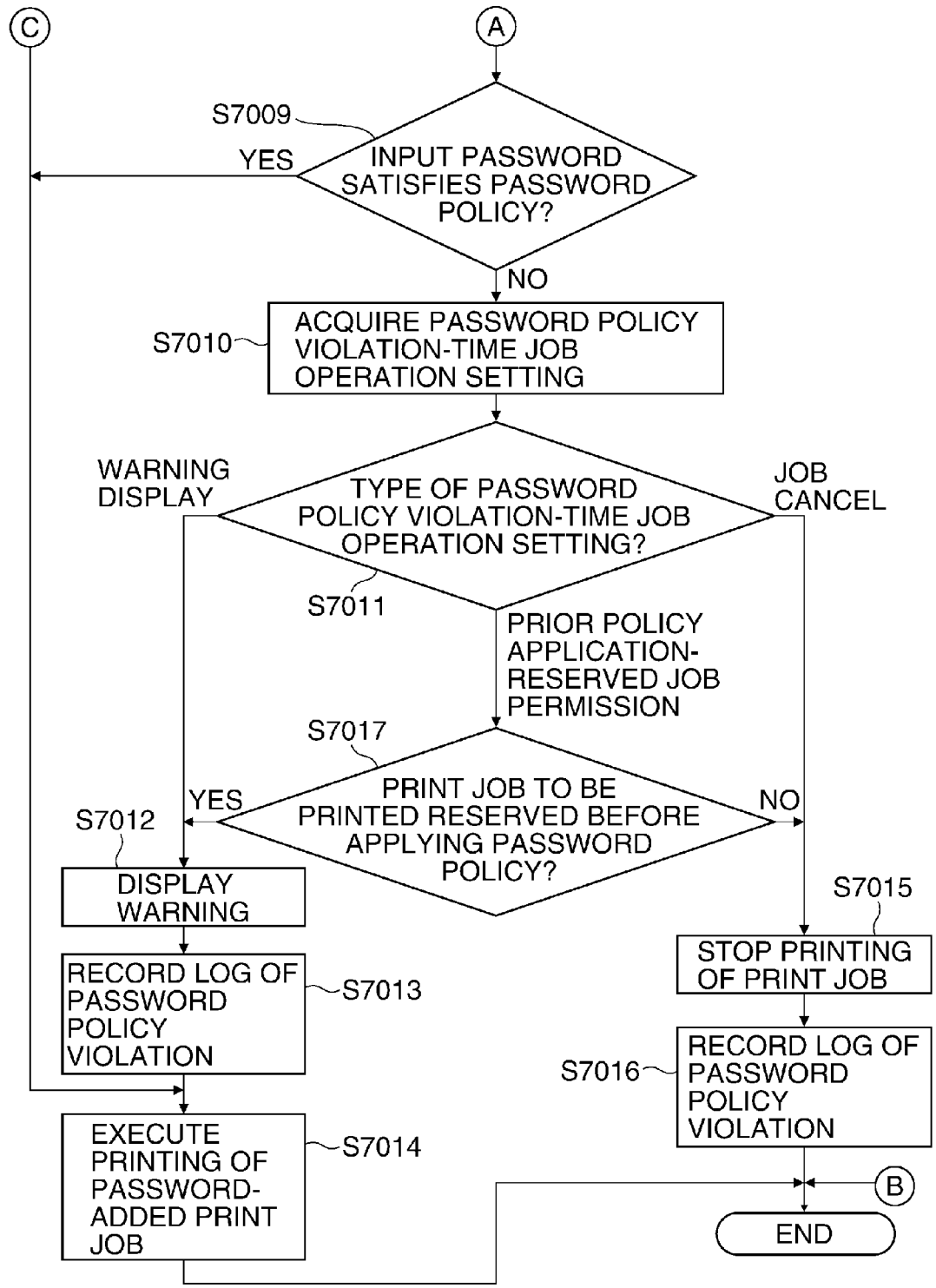
FIG. 9B is a continuation of FIG. 9A.

FIGS. 9A and 9B are a flowchart of the password-added print job printing process executed in the step S5010 in FIG. 6B.

Referring to FIG. 9A, first, the control section 1 receives a password input by the user (step S7001), acquires a password added to the password-added print job (step S7002), and then compares the password input by the user and the acquired password added to the password-added print job (step S7003) to thereby determine whether or not these passwords match (step S7004).

If it is determined in the step S7004 that the passwords match (YES to the step S7004), the control section 1 acquires the password policy setting stored in the SRAM 213 (step S7006), whereas if the passwords do not match (NO to the step S7004), the control section 1 displays the fact that the passwords do not match (step S7005), and stops print processing of the print job (step S7018), followed by terminating the present process.

In a step S7007 following the step S7006, the control section 1 determines whether or not the password policy setting acquired in the step S7006 sets application of the password policy to the password input by the user. Note that application of the password policy can be set by selecting a password policy setting enable button 9002 in FIG. 10, referred to hereinafter.

If the acquired password policy setting sets application of the password policy to the password (YES to the step S7007), the control section 1 compares the input password and the password policy of the print job (step S7008) to thereby determine whether or not the input password satisfies the password policy (step S7009 in FIG. 9B).

If it is determined in the step S7009 that the input password does not satisfy the password policy (NO to the step S7009), the control section 1 acquires a password policy violation-time job operation setting which is set via the password policy function-setting screen described hereinafter with reference to FIG. 10, for defining an operation to be performed when the password policy is violated (step S7010), and determines whether the type of the password policy violation-time job operation setting is a warning display setting, a job cancel setting, or a prior policy application-reserved job permission setting which permits printing of a print job reserved before application of the password policy (step S7011), and if the type of the job operation setting is the prior policy application-reserved job permission setting, the control section 1 determines whether or not the print job to be printed is a print job reserved before applying the password policy (step S7017).

The determination in the step S7017 is performed based on the date and time at which the password policy was applied. More specifically, it is determined whether the date and time at which the password-added print job was received is earlier or later than date and time at which the contents of the password policy set via the password policy function-setting screen were stored in the SRAM 213 (hereafter referred to as the "reference date and time"). When the password-added print job was received earlier than the reference date and time, it is determined that the job is a print job reserved before applying the password policy, whereas when the password-added print job was received later than the reference date and time, it is determined that the job is not a job reserved before applying the password policy.

If it is determined in the steps S7007 and S7009 that the password policy setting acquired in the step S7006 does not set application of the password policy to the password (NO to the step S7007), or the input password satisfies the password policy (YES to the step S7009), the control section 1 executes print processing of the password-added print job (step S7014 in FIG. 9B), followed by terminating the present process.

If it is determined in the step S7011 that the type of the password policy violation-time job operation setting, acquired in step S7010, is the warning display setting (warning display in the step S7011), or if the type of the job operation setting is the prior policy application-reserved job permission setting and the print job to be printed is a print job reserved before applying the password policy (YES to the step S7017), the control section 1 displays a warning (step S7012), records a log of password policy violation (step S7013), and executes print processing of the password-added print job (step S7014), followed by terminating the present process.

If it is determined in the step S7011 that the type of the password policy violation-time job operation setting, acquired in the step S7010, is the job cancel setting (job cancel in the step S7011) or if the type of the job operation setting is the prior policy application-reserved job permission setting and the print job to be printed is not a print job reserved before applying the password policy (NO to the step S7017), the control section 1 stops print processing of the print job (step S7015), and records a log of password policy violation (step S7016), followed by terminating the present process.

Here, in stopping print processing of the print job (step S7015), it is only required to stop execution of the print job itself, and for example, execution of the print job may be prevented by disabling the operation of a print execution button (not shown) of the console section 210.

The log recorded in the step S7013 includes e.g. the user name, job name, received date and time, and date and time of execution of print processing of the password-added print job, and information indicating the password policy violation.

According to the password-added print job printing process in FIGS. 9A and 9B, when a password input to the multifunction peripheral 1000 for which a password policy is set does not satisfy the password policy (NO to the step S7009), the user is warned of a policy violation (step S7012) or print processing of the print job is stopped (step S7015), and hence it is possible to cause the user to recognize the password policy violation while maintaining convenience of execution of printing, and thereby make the user aware that it is necessary to set a password having higher security when the user inputs an instruction for printing a password-added print job next time, and further, it is possible to cause the user to follow the password policy of the multifunction peripheral 1000, and thereby cause the multifunction peripheral 1000 to be operated while strictly maintaining security.

Further, according to the password-added print job printing process in FIGS. 9A and 9B, if the type of the password policy violation-time job operation setting is the prior policy application-reserved job permission setting and the print job to be printed is a print job reserved before applying the password policy (YES to the step S7017), print processing of the password-added print job is executed (step S7014) while displaying the warning (step S7012), whereas if the type of the job operation setting is the prior policy application-reserved job permission setting and the print job to be printed is not a print job reserved before applying the password policy (NO to the step S7017), print processing of the print job is stopped (step S7015). Therefore, even in a case where the password policy is violated, notification of the password policy violation to the user can be performed while maintaining user-friendliness, in a manner compatible with inhibition of print processing with importance given to strict security observation, with reference to the date and time at which the password policy was set.

Figure 10:
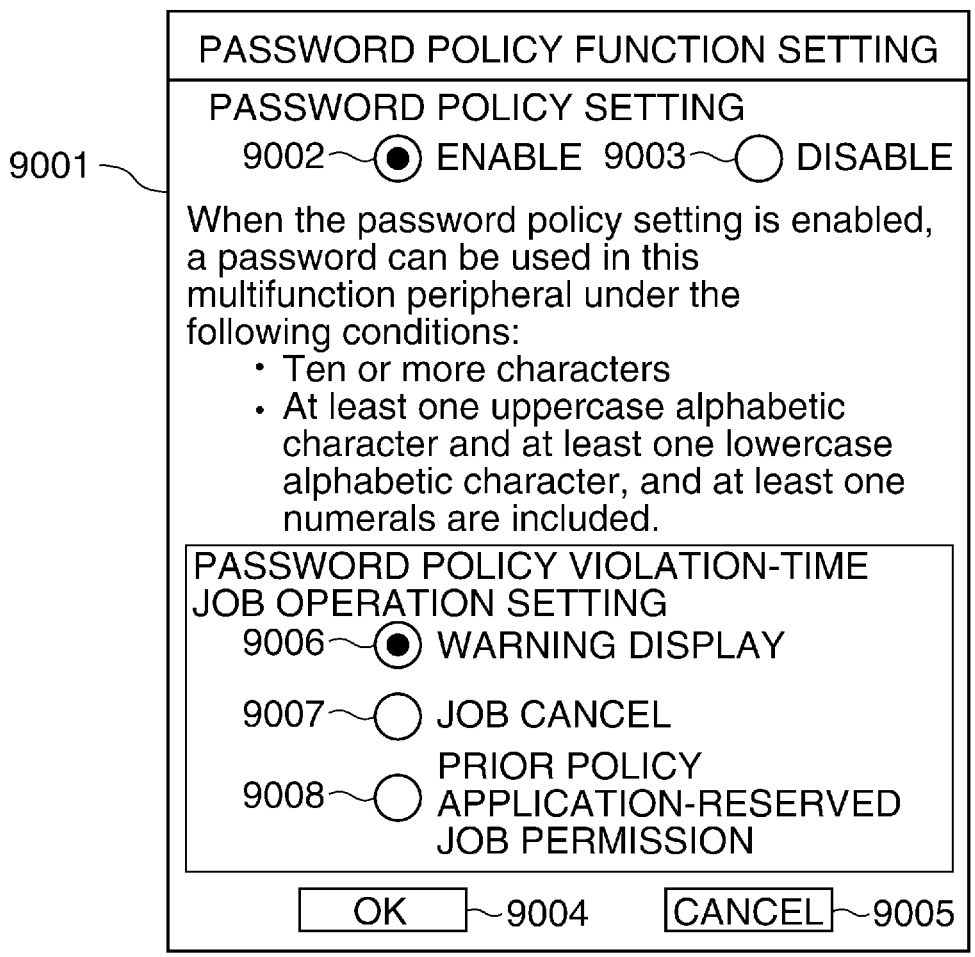
FIG. 10 is a diagram useful in explaining a password policy function-setting screen for setting a password policy acquired in the password-added print job printing process in FIGS. 9A and 9B.

FIG. 10 is a diagram useful in explaining the password policy function-setting screen 9001 for setting the password policy acquired in the step S7006 in FIG. 9A.

Referring to FIG. 10, the password policy function-setting screen 9001 includes the password policy setting enable button 9002, a password policy setting disable button 9003, an OK button 9004, a cancel button 9005, a warning display-setting button 9006, a job cancel-setting button 9007, and a prior policy application-reserved job permission setting button 9008.

By selecting one of the password policy setting enable button 9002 and the password policy setting disable button 9003, the password policy setting is executed. More specifically, when the password policy setting enable button 9002 is selected, a password added to a print job is required to satisfy the password policy. On the other hand, when the password policy setting disable button 9003 is selected, a password added to a print job is not required to satisfy the password policy.

When the password policy setting enable button 9002 is selected, it is possible to make a setting concerning an operation of the multifunction peripheral 1000 to be performed on a print job to be printed when the password policy is violated (the aforementioned password policy violation-time job operation setting), and for example, the warning display-setting button 9006, the job cancel-setting button 9007, and the prior policy application-reserved job permission setting button 9008 are enabled to be selected. The warning display-setting button 9006 is selected in a case where a warning is to be displayed when the password policy is violated, the job cancel-setting button 9007 is selected in a case where execution of the job is to be stopped when the password policy is violated, and the prior policy application-reserved job permission setting button 9008 is selected in a case where when the password policy is violated, whether or not to execute a job is determined according to the reference date and time of application of the password policy.

The OK button 9004 is pressed to complete the password policy setting, and the cancel button 9005 is pressed to abort the password policy setting. The contents of the password policy setting set when the OK button 9004 is pressed are stored in the SRAM 213.

Note that the password policy setting and the password policy violation-time job operation setting can be set only by a user having administrative authority of the multifunction peripheral 1000. The password policy setting may be set via the console section 210 of the multifunction peripheral 1000, or may be set via a remote user interface.

In a case where the password policy setting is applied, a password used in the multifunction peripheral 1000 is only required to be a complex one, and particularly, the password is preferable to be formed by ten or more characters, and include at least one uppercase alphabetic character, at least one lowercase alphabetic characters, and at least one numeral.

Figure 11A:
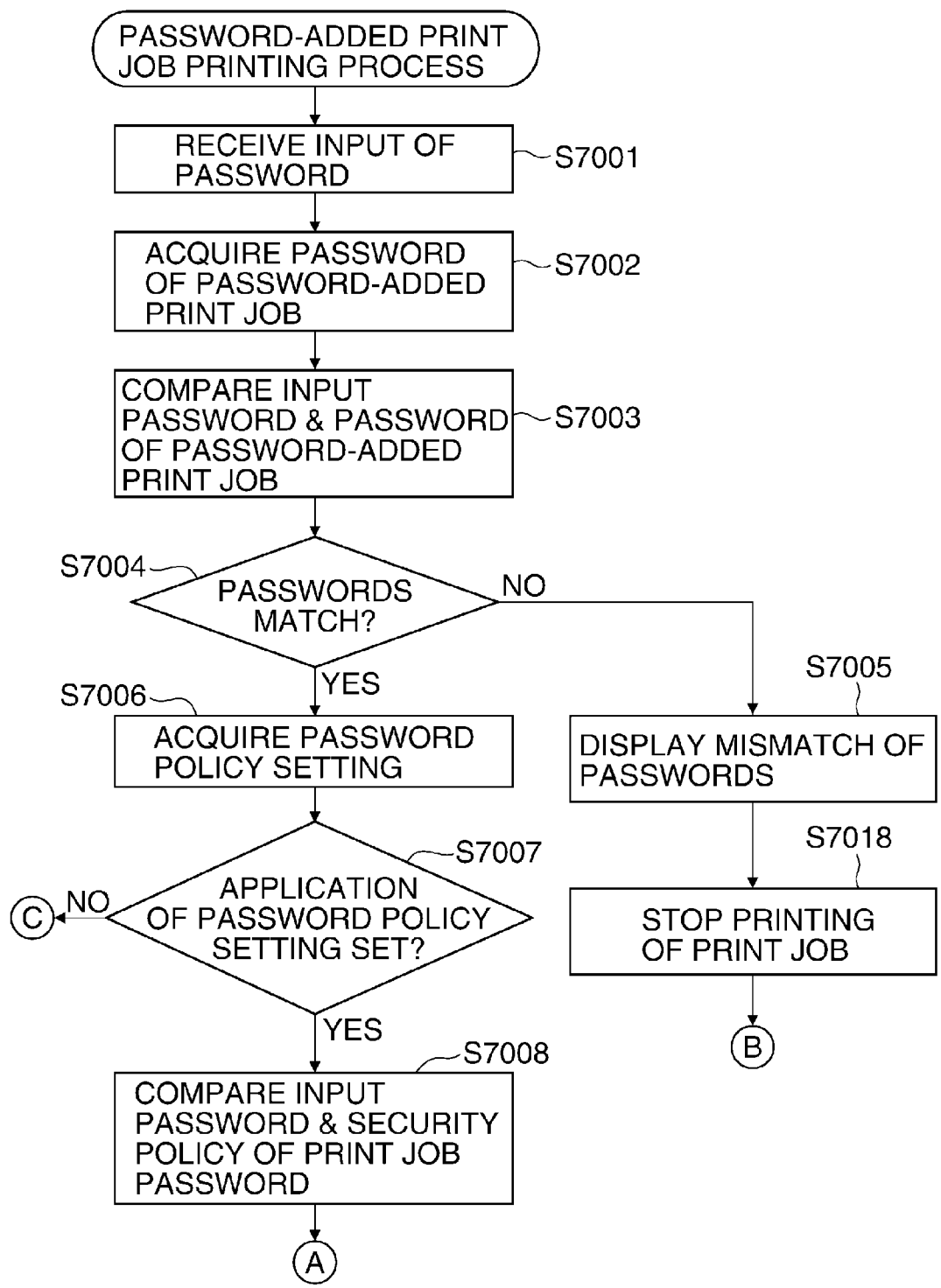
FIG. 11A is a flowchart of a variation of the password-added print job printing process in FIGS. 9A and 9B.
Figure 11B:
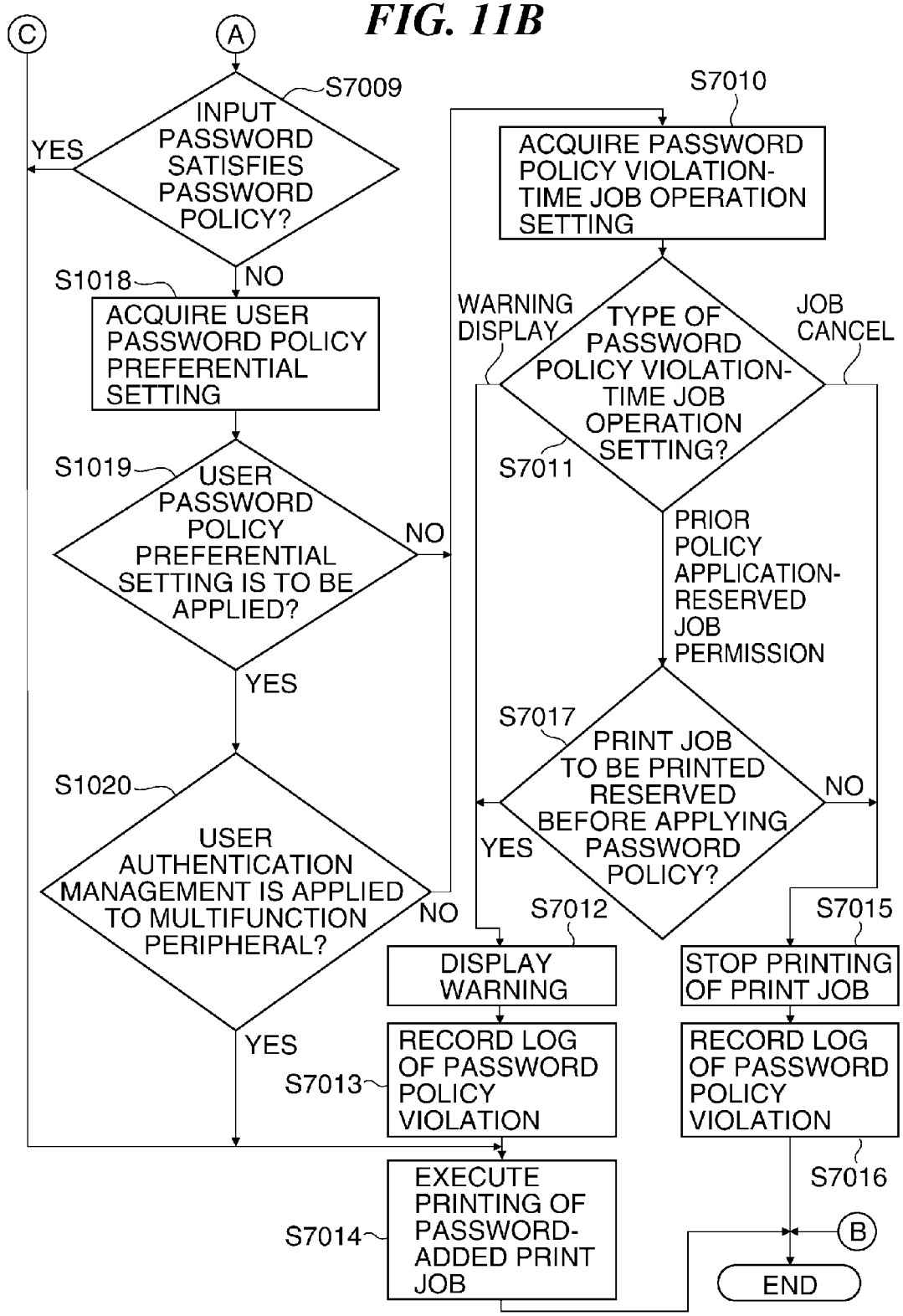
FIG. 11B is a continuation of FIG. 11A.

FIGS. 11A and 11B are a flowchart of a variation of the password-added print job printing process in FIGS. 9A and 9B.

The steps S7001 to S7018 in FIG. 11A are the same steps S7001 to S7018 in FIG. 9A, and the description will be given only of different points from the password-added print job printing process in FIGS. 9A and 9B.

Figure 12:
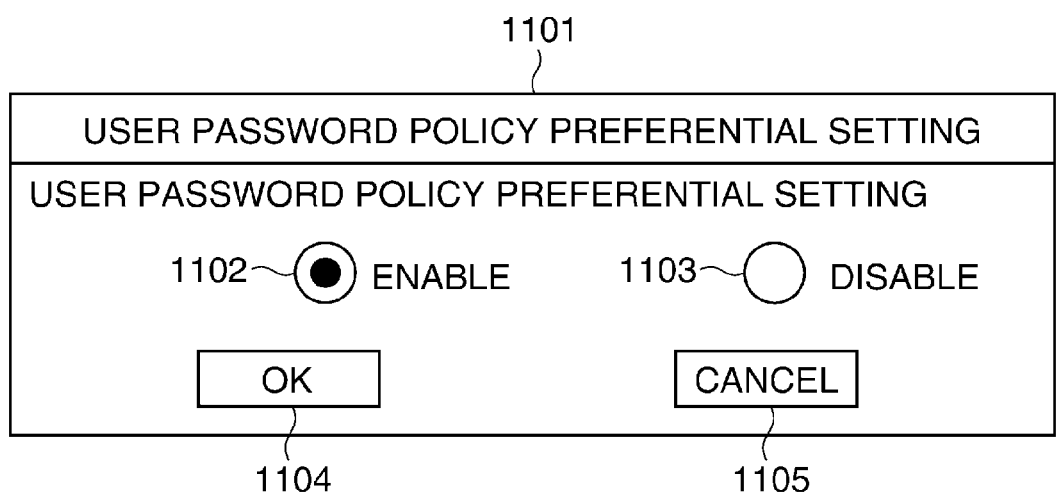
FIG. 12 is a diagram useful in explaining a screen for making a user password policy preference setting acquired in the password-added print job printing process in FIG. 11.

Referring to FIG. 11B, if it is determined in the step S7009 that the input password does not satisfy the password policy (NO to the step S7009), the control section 1 acquires the contents of user password policy preferential setting which has been set via a user password policy preference-setting screen, shown in FIG. 12, and stored in the SRAM 213 (step S1018).

Referring to FIG. 12, the setting on whether or not to execute preferential application of the user password policy in the multifunction peripheral 1000 (hereinafter referred to as the "user password policy preferential setting") is made on the user password policy preference-setting screen, denoted by reference numeral 1101. If the user password policy preferential setting is applied, in a case where a user password satisfies the user password policy in the variation of the password-added print job printing process shown in FIGS. 11A and 11B, print processing of the password-added print job can be executed even in a case where a password set for the print job violates the password policy.

The user password policy preference-setting screen 1101 includes an enable button 1102, a disable button 1103, an OK button 1104, and a cancel button 1105. The enable button 1102 is pressed to apply the user password policy preferential setting, and the disable button 1103 is pressed not to apply the user password policy preferential setting. The OK button 1104 is pressed to cause the setting to take effect, and the cancel button 1105 is pressed to cancel a change in the setting. The setting is stored in the SRAM 213. Note that the user password policy preferential setting can be set by an administrator of the multifunction peripheral 1000. The user password policy preferential setting may be set via the console section 210 of the multifunction peripheral 1000, or may be set via a remote user interface.

Referring back to FIG. 11B, the control section 1 determines whether or not the user password policy preferential setting acquired in the step S1018 is applied (step S1019), and determines whether or not the user authentication management is applied to the multifunction peripheral 1000 (step S1020).

If it is determined in the steps S1019 and S1020 that the user password policy preferential setting is applied (YES to the step S1019), and the user authentication management is applied to the multifunction peripheral 1000 (YES to the step S1020), the control section 1 executes print processing of the password-added print job (step S7014), followed by terminating the present process. On the other hand, if the user password policy preferential setting is not applied (NO to the step S1019), or the user authentication management is not applied to the multifunction peripheral 1000 (NO to the step S1020), the control section 1 executes the steps S7010 et seq.

According to the variation of the password-added print job printing process in FIGS. 11A and 11B, even when an input password set for a print job does not satisfy the password policy (NO to the step S7009), if the user password policy preferential setting is applied (YES to the step S1019) and the user authentication management is applied to the multifunction peripheral 1000 (YES to the step S1020), print processing of the print job is executed (step S7014). Insofar as the user authentication management is applied to the multifunction peripheral 1000, it is judged that security strength is not significantly reduced, and hence it is possible to execute print processing of the print job without significantly reducing security strength.

On the other hand, when the input password does not satisfy the password policy (NO to the step S7009) and also the user password policy preferential setting is not applied (NO to the step S1019) or the user authentication management is not applied to the multifunction peripheral 1000 (NO to the step S1020), how to handle the print job is determined according to the password policy violation-time job operation setting (steps S7011 and S7017), and hence this causes the user to be necessarily aware that the password of the print job violates the password policy, and set a password for a print job such that the password satisfies the password policy thereafter, whereby it is possible to reduce a security risk generated in executing print processing of the print job.

Figure 13A:
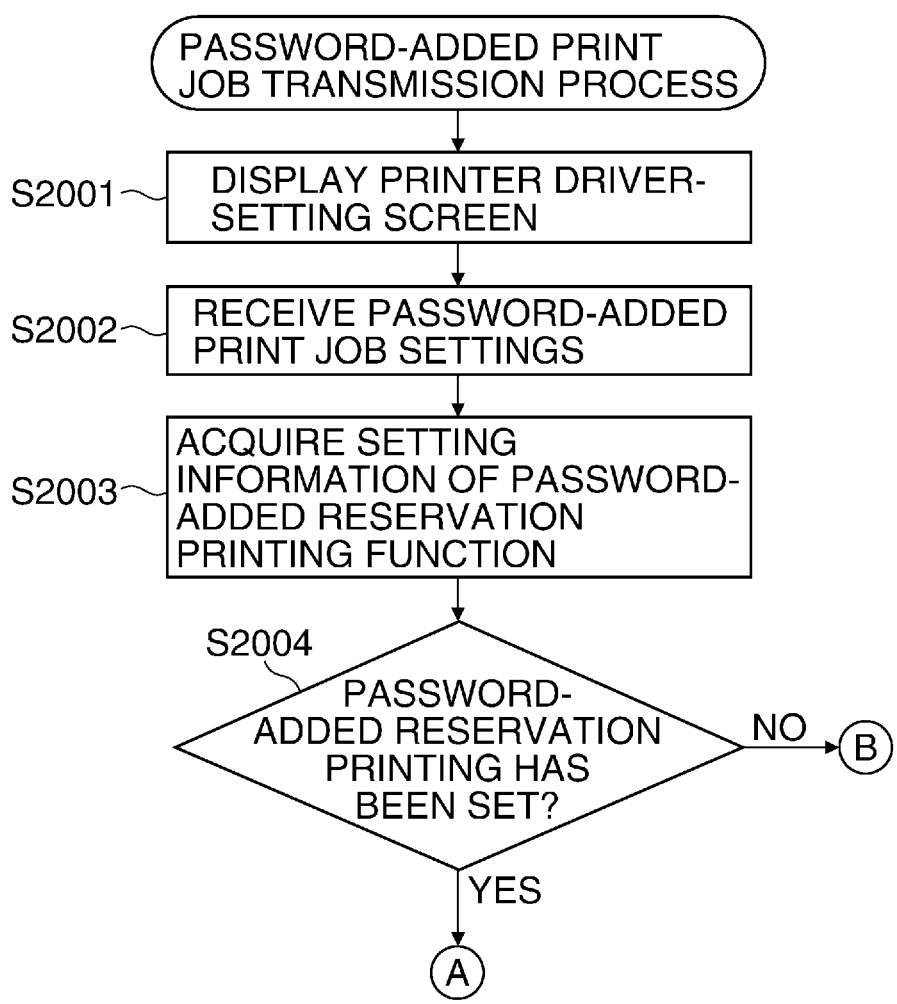
FIG. 13A is a flowchart of a variation of the password-added print job transmission process in FIG. 4.
Figure 13B:
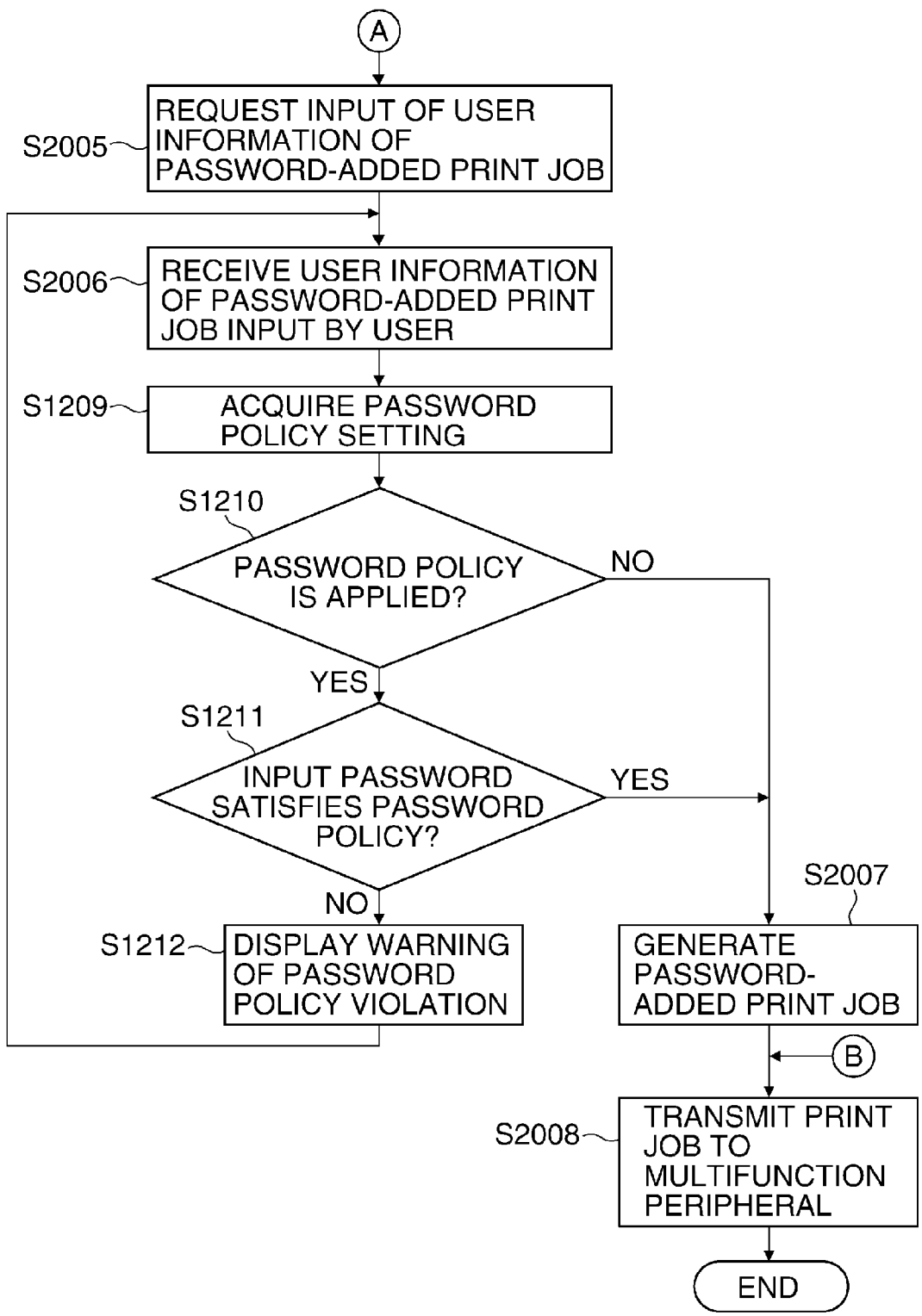
FIG. 13B is a continuation of FIG. 13A.

FIGS. 13A and 13B are a flowchart of a variation of the password-added print job transmission process in FIG. 4.

The steps S2001 to S2006 and S2007 to S2008 in FIGS. 13A and 13B are the same steps S2001 to S2006 and S2007 to S2008 in FIG. 4, and the description will be given only of different points from the password-added print job transmission process in FIG. 4.

After receiving the user information of the input password-added print job in the step S2006 in FIG. 13B, the printer driver 22 acquires the password policy setting from the multifunction peripheral 1000 (step S1209), determines whether or not the acquired password policy setting of the multifunction peripheral 1000 is applied (step S1210), and determines whether or not the input password satisfies the password policy (step S1211).

If it is determined in the steps S1210 and S1211 that the acquired password policy of the multifunction peripheral 1000 is to be applied (YES to the step S1210), and the input password does not satisfy the password policy (NO to the step S1211), the printer driver 22 displays a warning on the PC display section 24 to the effect that the password violates the password policy (step S1212), and repeats the steps S2006 et seq.

If it is determined in the steps S1210 and S1211 that the acquired password policy of the multifunction peripheral 1000 is not to be applied (NO to the step S1210), or the input password satisfies the password policy (YES to the step S1211), the printer driver 22 generates a password-added print job (step S2007), and transmits the generated print job to the multifunction peripheral 1000 (step S2008), followed by terminating the present process.

According to the process in FIGS. 13A and 13B, when a password input by a user for a print job satisfies the password policy of the multifunction peripheral 1000, which is acquired by the printer driver 22 (YES to the step S1211), the print job can be generated (step S2007), and hence the user can perform printing after inputting the password from the console section 210 of the multifunction peripheral without being conscious of the password policy set for the print job, whereby print processing can be executed after generating the print job without delay.

Although in the embodiment of the present invention, the description has been given of the print job as an example of a password-added job, the password-added job may be any other password-added job handled by the multifunction peripheral, and for example, the present invention can be applied to a case where a password is added to setting value data of the multifunction peripheral and TPM (Trusted Platform Module) backup data.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-229245 filed Nov. 5, 2013, which is hereby incorporated by reference herein in its entirety.

What is claimed is:

1. An image forming apparatus comprising:
at least one processor and at least one memory coupled to the at least one processor which act as:
an authentication control unit configured to execute a user authentication using a password;
a setting unit configured to set a password policy defining a password which can be used for the user authentication, in terms of at least one of a length of the password, and a kind of character included in the password;
a receiving unit configured to receive data, which includes a password, from an information processing apparatus;
an input unit configured to input a password in accordance with an operation by a user; and
an execution unit configured to execute a processing using the received data in a case where the password input by the input unit is compared with the password included in the received data, the password included in the received data is compared with the password policy, it is determined that the password input by the input unit matches the password included in the received data, and it is determined that the password included in the received data satisfies the password policy.

2. The image forming apparatus according to claim 1, wherein said execution unit is a printing unit, the received data is print data, and said printing unit executes processing for printing the print data, in a case where the password input by the input unit matches the password included in the received print data.

3. The image forming apparatus according to claim 1, wherein the at least one processor and at least one memory further act as a warning display unit configured to display a warning based on determination performed by said determination unit.

4. The image forming apparatus according to claim 1, wherein the at least one processor and at least one memory further act as a cancellation unit configured to cancel the processing executed by said execution unit based on determination performed by said determination unit.

5. The image forming apparatus according to claim 1, wherein said setting unit sets the password policy according to an operation by an administrator.

6. The image forming apparatus according to claim 1, wherein said setting unit sets processing to be executed in a situation that the password policy is not satisfied, according to an operation by the administrator.

7. The image forming apparatus according to claim 6, wherein the processing to be executed in a situation that the password policy is not satisfied is at least one of cancel processing and warning display processing.

8. The image forming apparatus according to claim 1, wherein the at least one processor and at least one memory further act as a recording unit configured to record a log of password policy violation in a situation that the password policy is not satisfied.

9. The image forming apparatus according to claim 1, wherein the at least one processor and at least one memory further act as a unit configured to compare a time at which the data including the password was received and a time at which the setting of the password policy by said setting unit was applied, and control based on the comparative result whether to permit or inhibit processing of the received data.

10. The image forming apparatus according to claim 1, wherein the at least one processor and at least one memory further act as a unit configured to control whether to permit or inhibit processing of the received data according to whether or not a user authentication function has been enabled.

11. The image forming apparatus according to claim 1, wherein the set password policy is applied to both a first password used for logging into the image forming apparatus and a second password used for executing the processing using the received data.

12. A system comprising:
an information processing apparatus; and
an image forming apparatus,
wherein at least one processor and at least one memory coupled to the at least one processor included in the information processing apparatus act as:
a first input unit configured to input a password in accordance with an operation by a user; and
a transmission unit configured to transmit data including a password to the image forming apparatus, the password included in the data being the password input by the first input unit,
wherein at least one processor and at least one memory coupled to the at least one processor included in the image forming apparatus act as:
an authentication control unit configured to execute a user authentication using a password;
a setting unit configured to set a password policy defining a password which can be used for the user authentication, in terms of at least one of a length of the password, and a kind of character included in the password;
a receiving unit configured to receive data, which includes a password, from the information processing apparatus;
a second input unit configured input a password in accordance with an operation by a user; and
an execution unit configured to execute a processing using the received data in a case where the password input by the second input unit is compared with the password included in the received data, the password input by the first input unit is compared with the password policy, it is determined that the password input by the second input unit matches the password included in the received data, and it is determined that the password input the by the first input unit satisfies the password policy, and
wherein at least one processor and at least one memory coupled to the at least one processor included in the information processing apparatus further act as:
an acquisition unit configured to acquire information indicative of the password policy from the image forming apparatus; and
a determination unit configured to determine based on the acquired information whether or not the password input by the first input unit satisfies the password policy.

13. A method of controlling an image forming apparatus, comprising:
executing a user authentication using a password;
setting a password policy defining a password which can be used for the user authentication, in terms of at least one of a length of the password, and a kind of character included in the password;
receiving data, which includes a password, from an information processing apparatus;
inputting a password in accordance with an operation by a user; and
executing a processing using the received data in a case where the password input in accordance with the operation by the user is compared with the password included in the received data, the password included in the received data is compared with the password policy, it is determined that the password input in accordance with the operation by the user matches the password included in the received data, and it is determined that the password included in the received data satisfies the password policy.

14. A non-transitory computer-readable storage medium storing a computer-readable program for causing a computer to execute a method of controlling an image forming apparatus,
wherein the method comprises:
executing a user authentication using a password;
setting a password policy defining a password which can be used for the user authentication, in terms of at least one of a length of the password, and a kind of character included in the password;
receiving data, which includes a password, from an information processing apparatus;
inputting a password in accordance with an operation by a user; and
executing a processing using the received data in a case where the password input in accordance with the operation by the user is compared with the password included in the received data, the password included in the received data is compared with the password policy, it is determined that the password input in accordance with the operation by the user matches the password included in the received data, and it is determined that the password included in the received data satisfies the password policy.

* * * * *